J. WAINWRIGHT.
SURVEYING INSTRUMENT.
APPLICATION FILED APR. 29, 1913.

1,108,034.

Patented Aug. 18, 1914.
2 SHEETS—SHEET 1.

J. Wainwright.
INVENTOR

WITNESSES

BY

ATTORNEY

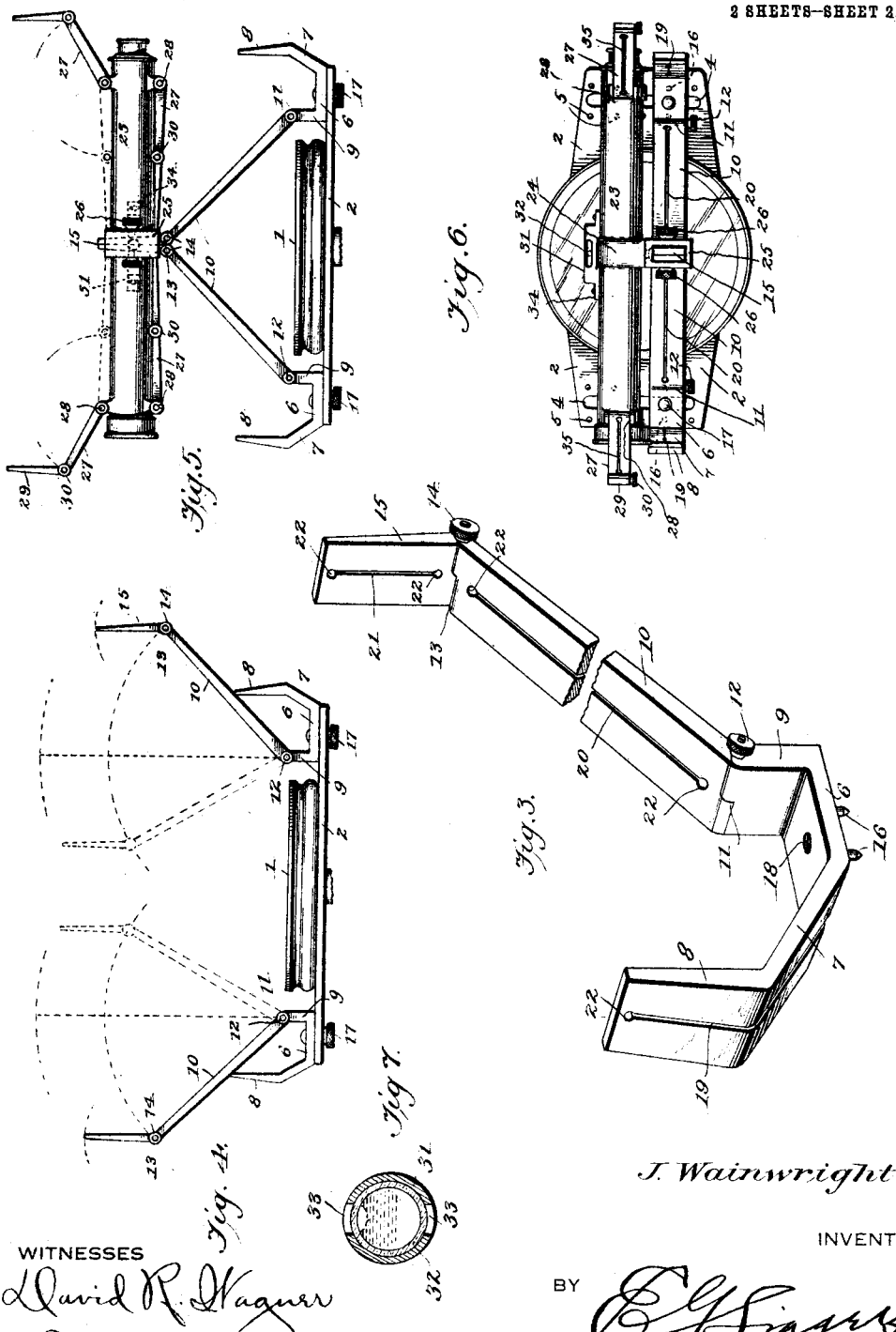

UNITED STATES PATENT OFFICE.

JOHN WAINWRIGHT, OF BENEZETTE, PENNSYLVANIA.

SURVEYING INSTRUMENT.

1,108,034.      Specification of Letters Patent.      Patented Aug. 18, 1914.

Application filed April 29, 1913. Serial No. 764,366.

*To all whom it may concern:*

Be it known that I, JOHN WAINWRIGHT, a citizen of the United States, residing at Benezette, in the county of Elk and State of Pennsylvania, have invented a new and useful Surveying Instrument, of which the following is a specification.

This invention has reference to improvements in surveying instruments, and its object is to provide an instrument like that shown and described in Letters Patent No. 997,222, granted to me on July 4, 1911, and to increase the range of usefulness of the instrument set forth in said Letters Patent, as well as to decrease the weight of the instrument.

In accordance with the present invention there is provided a compass with a base plate, and the ends of the base plate are formed to receive sights each with a long and a short arm and reversible with reference to the compass, as well as adjustable laterally with respect to the north and south line of the compass. The long arm of each sight is jointed at two spaced points, thus giving a great length of sighting range with a minimum length of supporting plate for the compass and sights. The sights are also adapted to receive and support either singly or jointly a telescope without the necessity of balancing weights, since the telescope and sights may be brought into equilibrium with reference to the north and south line of the compass and, moreover, the instrument is made practically universal in its usefulness by providing the telescope with similar sights and with a level also arranged that the telescope may be turned over for use from either end of the compass structure.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings, but may be changed and modified so long as such changes and modifications mark no material departure from the salient features of the invention.

Figure 1:
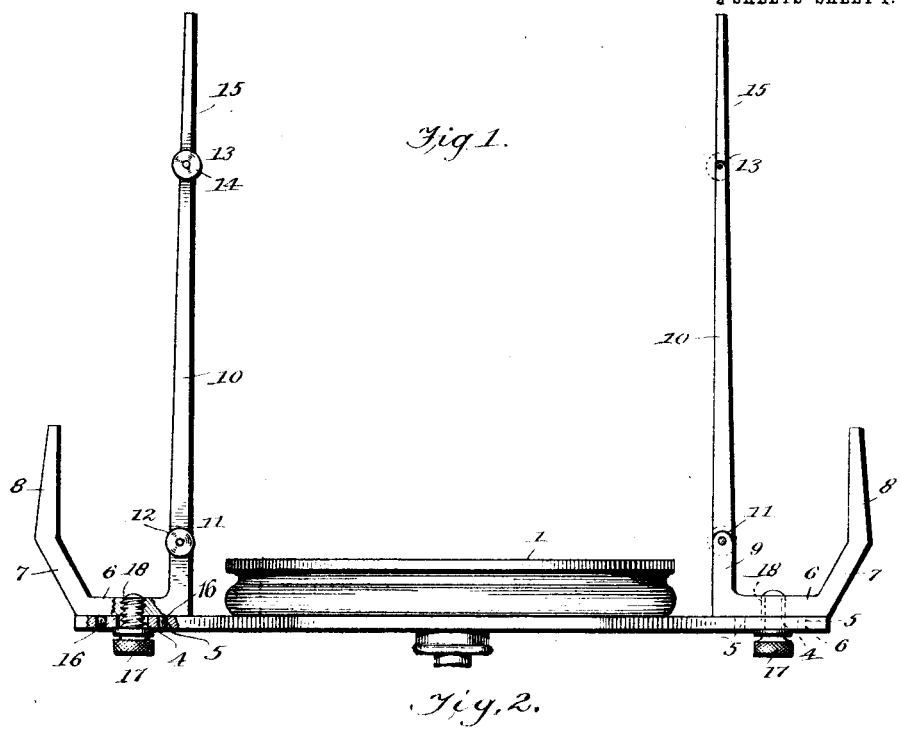
Figure 2:
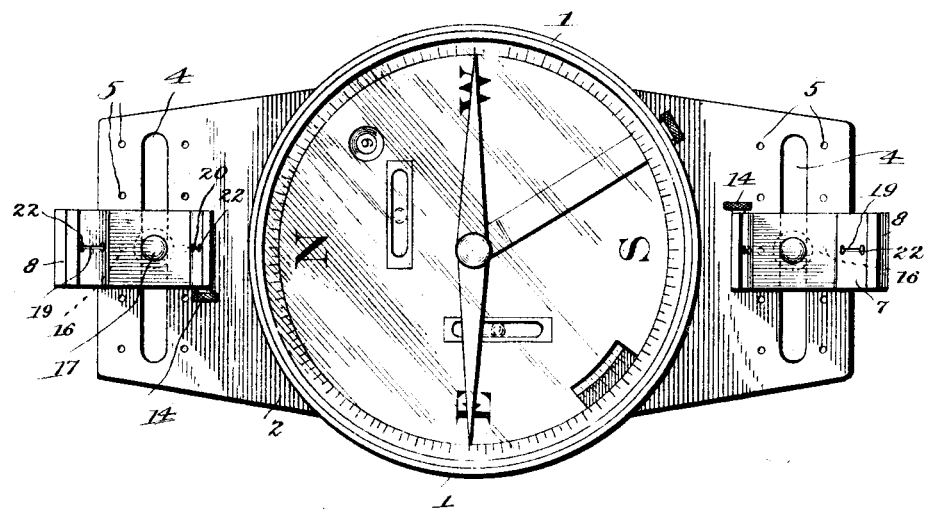

In the drawings:—Figure 1 is an elevation with some parts in section of a sighting compass with the improved sights applied. Fig. 2 is a plan view of the structure shown in Fig. 1. Fig. 3 is a perspective view of one of the sights. Fig. 4 is an elevation showing some of the adjustments of the sights. Fig. 5 is an elevation showing a telescope attached and also showing some of the adjustments of the telescope sights. Fig. 6 is a plan view of the structure shown in Fig. 5. Fig. 7 is a cross section of the double sight telescope level.

Referring to the drawings there is shown a compass 1 which may be considered as following the usual construction in vernier compasses, and so needs no particular description. The compass is mounted upon a plate 2, as is customary, and this plate is provided with a head for attachment to a tripod or Jacob's staff. It is customary to make the plate 2 quite long in order that the sighting means designed to be applied to the plate may be sufficiently far apart, but with the present invention the length of the plate is considerably reduced, without, however, reducing the available distance between the sights. The usual length of plate employed is about fifteen and one-half inches, while with the present invention it need not exceed about ten inches with a compass having a six inch needle, and the compass box itself being about seven inches in diameter.

Near each end of the plate 2 there is produced a slot 4 transverse to the north and south line, and extending about equal distances to both sides of such line. On each side of each slot is a series of perforations 5 for a purpose which will presently appear. The slots and perforations are provided to permit securing to the plate sight structures, each comprising a body member 6 having at one end an upstanding portion 7 rising from the body member at an angle thereto and terminating in a portion 8 substantially perpendicular to the body member, and at an angle to the intermediate portion 7. At the other end of the body member 6 is a shorter upright 9 substantially perpendicular to the body member 6. Carried by and hinged to the upper end of the upright 9 is an arm 10, the hinge connection being shown at 11 with a clamping screw 12 carried by the hinged pintle to secure the arm 10 in any suitable adjusted position. Connected to the free end of the arm 10 by a hinge 13 having its pintle supplied with a clamp screw 14, is a member 15 constituting an extension of the arm 10 in hinged relation thereto, the axes of the two hinges 11 and 13 being parallel one to the other. The arm 10 with its extension 15 rises to a considerably greater height than the portions 7 and 8 at the other end of the base member 6 and which may be termed a rigid arm in contradistinction to the hinged arm 10 and 15. When the sight member is placed upon the plate 2 with positioning pins 16 projecting from the under side of the body member or base 6 engaging in suitable ones of the perforations 5, and a clamp screw 17 extending through an appropriate slot 4 and entering the threaded passage 18 through the base plate or body member 6, the sight may be manipulated by loosening the clamp nuts 12 and 14, or either of them to adjust the arm 10 and its continuation 15 in any one of numerous positions, some of which are indicated in Fig. 4. With the arms 10 moved on their hinges until in engagement with the upper ends 8 of the fixed arms 7 and the extensions 15 upright, these extensions 15 are as far apart as the sights usually provided with compass surveying instruments, while the main plate 2 is only about two-thirds as long as the plate needed for the ordinary sight standard. By reversing the sights so that the fixed arms are inward and the hinged arms are outward a still greater range is possible.

The fixed arm 7 and 8 of each sight member is provided with a sight slot 19, while the arm 10 is provided with a longitudinal sight slot 20 and the extension 15 may have a longitudinal sight slot 21, and all these sight slots may have enlarged terminal portions 22. Furthermore, the sight slots may follow any of the usual forms in instruments of this character.

To enlarge the usefulness of the instrument a telescope 23 is provided and this telescope has an intermediate clamp member 24 terminating in a loop 25 shaped to embrace the extensions 15 when the arms 10 are moved one toward the other until these extensions come together above the compass, and the loop 25 is applied over these extensions until it rests upon the hinges 13, and is then made fast by thumb screws 26. The telescope is provided near the ends with sight members 27 having hinge connections 28 with the telescope and terminal extensions 29 fast to the members 27 by hinges 30, so that the sight members 27 with the extensions 29 are like the sight arms 10 and extensions 15. The telescope is provided with sight members 27 on opposite sides, so that the telescope is readily reversible and may be used from either the north or south end of the compass without the necessity of changing the instrument. Attached to the side of the telescope remote from the clamp loop 25 is a casing 31 inclosing a level glass 32. The casing 31 is provided with diametrically opposite sight openings 33 and at the ends is provided with ears 34 by means of which the level is attached to the telescope and one of the ears may have a laterally extended slot for a suitable initial adjustment of the level. The sight openings 27 like the arms 10 have sighting slots 35.

For convenience of description the sight member at the north end of the compass will be termed the north sight and that at the south end of the compass will be termed the south sight. When the hinged arms of the sights are moved away one from the other until they rest upon the upper ends of the fixed arms and the extensions 15 are upright, then these extensions are separated one from the other by a distance equal to the separation of similar sights when mounted upon the ends of the fixed plates usually provided for supporting the compass. Suppose that it is desirable to sight up a steep grade, then the long arm of either the north or the south sight, as the case may be, may be swung on its hinge toward the center of the compass and the extension 15 may be swung on its hinge with respect to the arm 10 and a sight may be taken at a very steep angle through the fixed or short arm up through the sight openings of the long arm, and the reverse of this operation is possible for sighting down steep grades. The double jointed long arms, together with the shorter arms both provided with sight openings permit a multitude of positions not possible with a single jointed arm, or a fixed arm. Moreover, by swinging the long arms toward each other as in Fig. 5 until the extensions 15 engage, and then applying the telescope 23, the thumb screws 17 having first been loosened, and the sights shifted west, in this condition of the parts the telescope may be brought into balanced relation with the sight arms, or even may be brought directly in the north and south line of the compass, thus permitting very accurate work and also avoiding the necessity of counterbalancing the telescope by the addition of weights.

The sights on the telescope permit the use of the instrument under light conditions which would tend to render the telescope useless. The sights on the telescope permit back sighting without the necessity of revolving the telescope and, moreover, these sights permit working in dark places where the sights are more advantageous than the telescope would be, and this with a saving in time. The sights are readily foldable, down upon the telescope when not in use, and so may then be out of the way. Moreover, the double joint on each sight gives a decidedly longer range between the sights, which is of marked advantage.

By placing the telescope on, say, the south sight surveying may be performed on level ground or running up hill, and in this case the short arm of the sight may be presented toward the compass and the long arm folded over on it in the same manner as indicated in Fig. 4, but in the reverse position to the showing of Fig. 4. By employing the instrument with the parts related as shown in Fig. 4, but with the long arm of each sight in one of the dotted line positions, the surveyor can take back and fore sights at any angle of elevation up and down steep pitches, and this without hindrance or loss of time, by simply swinging and folding the long arms of the double sights, an action impossible with a compass having the common perpendicular sight members. In fact, the instrument of the present invention provides a sight compass that can be put to all uses required for surveying in either level or hilly country, and when the telescope is in place at the top of either or of both sights, as may be desired, a convenient and inexpensive transit is formed.

The facility with which the telescope may be mounted and the sighting can be done by either the sights or the telescope and back sighting may be performed through the sights without having to revolve the telescope, jarring of the instrument out of line is avoided, and there is no loss of time for readjustments.

The instrument of the present invention is capable of use by a surveyor having a mixed practice of work.

What is claimed is:—

1. In a surveying instrument, a compass plate and compass mounted thereon, the compass plate being provided with slots transverse to the length of the plate, and sights mounted to be moved lengthwise of the slots.

2. In a surveying instrument, a compass plate and compass mounted thereon, said plate having slots therein transverse to the length of the plate, and sights mounted on the plate and movable along the slots, and also reversible with respect to the length of the plate, the plate and sights having coacting parts for holding the sights in adjusted positions.

3. In a surveying instrument, a compass plate and compass mounted thereon, the compass plate having elongated slots disposed transversely to the north and south line of the compass and each provided with a series of perforations on each side of the slot, and a sight member for each slot having a projection adapted to any one of the perforations, and means extending through the slot for clamping the sight to the plate in any one of a number of adjusted positions.

4. In a surveying instrument, a compass plate and compass thereon, and a sight member having sight arms at opposite ends thereof, one arm being normally upright and in fixed relation to the sight member and the other arm being hinged to the sight member.

5. In a surveying instrument, a compass plate and compass thereon, and a sight member having sight arms at opposite ends thereof, one arm being normally upright and in fixed relation to the sight member and the other arm being hinged to the sight member, the second arm having an extension hinged thereto.

6. In a surveying instrument, a sight member having a sight arm provided at one end with a hinge connection to the surveying instrument constructed to permit movements of the sight arm to a vertical position and to opposite sides of such vertical position, said sight arm at the end remote from the hinge connection having a sighting extension hinged thereto and movable about the hinge to opposite sides of a position of alinement with said sight arm.

7. In a surveying instrument, a sight member comprising a basic portion, an arm in fixed relation to the basic portion and rising therefrom and provided with a sight opening, and at the other end provided with a rising portion having an arm hinged thereto and provided with a sight opening, said arm having an extension hinged to the arm and also provided with a sight opening.

8. In a surveying instrument, a telescope attachment having sight members at opposite ends hinged to the telescope and each provided with a prolongation hinged thereto.

9. In a surveying instrument, a telescope attachment having sight members at opposite ends hinged to the telescope and each provided with a prolongation hinged thereto, the telescope being also provided with a level provided with observation openings on opposite sides.

10. In a surveying instrument, a compass plate and compass thereon, the plate being provided at the north and south ends of the compass with elongated slots disposed transversely to the north and south line of the compass and with series of perforations on opposite sides of each slot, and sighting members each comprising a basic portion with a clamp member adapted to traverse the slot and clamp the basic portion of the plate, and said basic portion being provided with a pin adapted to enter any one of the perforations on opposite sides of the slot, said basic portion having at one end an upstanding fixed arm with a sight opening therethrough and at the other end an upstanding portion with an arm hinged thereto at one end and provided with a sight opening and at the other end having a continuation hinged to it, said continuation being also provided with a sight opening.

11. In a surveying instrument, a compass plate and compass thereon, the plate being provided at the north and south ends of the compass with elongated slots disposed transversely to the north and south line of the compass and with a series of perforations on the opposite sides of each slot, members each comprising a basic portion with a clamp adapted to traverse the slot and clamp the basic portion to the plate, and said basic portion being provided with pin means adapted to enter the perforations on opposite sides of the slot and also being provided at one end with an upstanding portion having an arm hinged at one end thereto and at the other end provided with an extension hingedly connected thereto, and a telescope having means for engaging the extensions of the hinged arms when brought together and provided with sighting means at the ends and with a level fast to it and having openings on opposite sides for the observation of the level.

12. In a surveying instrument, a compass plate and compass mounted thereon, members mounted on the compass plate on the north and south side of the compass and movable on the compass plate transversely of the north and south line of the compass, said members each being provided with an arm hinged at one end thereto with an extension thereof hinged to its other end, said arms being each of a length to bring the extensions into parallel engagement when the arms are moved upon their hinges one toward the other, and a telescope provided with means for securing it to the arm extensions when brought together to be supported thereby, said telescope being mounted for reversal and provided with sighting means at opposite ends and with a level constructed for observation from opposite sides.

In testimony, that I claim the foregoing as my own, I have hereto affixed my signature in the presence of two witnesses.

JOHN WAINWRIGHT.

Witnesses:
JAS. H. THOMPSON,
E. C. PISTNER.